United States Patent
Chan (10) Patent No.: US 9,020,071 B1
(45) Date of Patent: Apr. 28, 2015

(54) AMPLITUDE SHIFT KEYED (ASK) MODULATOR/TRANSMITTER WITH FAST FALL TIME

(71) Applicant: Hong Kong Applied Science & Technology Research Institute Company Limited, Hong Kong (HK)

(72) Inventor: Tat Fu Chan, Hong Kong (HK)

(73) Assignee: Hong Kong Applied Science & Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 14/316,768

(22) Filed: Jun. 26, 2014

(51) Int. Cl.
*H04L 27/04* (2006.01)
*H03D 1/24* (2006.01)
*H04B 14/00* (2006.01)
*H04B 5/00* (2006.01)

(52) U.S. Cl.
CPC .............. *H04L 27/04* (2013.01); *H04B 14/004* (2013.01); *H04B 5/0012* (2013.01)

(58) Field of Classification Search
CPC ......... H04L 27/00; H04L 27/04; H04L 20/49; H04B 1/40; H04H 20/30; G06F 2203/0384
USPC ......... 375/300, 259, 268, 316, 320, 345, 362; 327/50, 132, 217, 251
See application file for complete search history.

(56) References Cited

U.S. PATENT DOCUMENTS

| | | | |
|---|---|---|---|
| 6,292,067 B1 | 9/2001 | Sasabata et al. | |
| 7,965,792 B2 | 6/2011 | Kim et al. | |
| 2011/0285452 A1* | 11/2011 | Chia | 327/361 |
| 2013/0094562 A1 | 4/2013 | Kim et al. | |
| 2013/0142283 A1* | 6/2013 | Hori | 375/300 |
| 2013/0207708 A1* | 8/2013 | Agrawal et al. | 327/237 |
| 2013/0243120 A1 | 9/2013 | Tsai et al. | |

OTHER PUBLICATIONS

Kim et al., "A CMOS Transceiver for a Multistandard 13.56MHz RFID Reader Soc", IEEE Trans. on Indust. Elect., May 2010, pp. 1563-1572.
Min et al., "An Analog Front-End Circuit for ISO/IEC 14443-Compatible RFID Interrogators", ETRI Journal, Dec. 2004, pp. 560-564.

* cited by examiner

*Primary Examiner* — Khai Tran
(74) *Attorney, Agent, or Firm* — gPatent LLC; Stuart T. Auvinen (57) ABSTRACT

An Amplitude-Shifted-Keyed (ASK) modulator/transmitter has fall time enhanced by pulsing pull-up and pull-down enhancement switches on for a short period of time after a data transition. The enhancement switches draw energy from a coupling capacitor to more rapidly reduce an amplitude of the carrier wave being output. An input carrier wave is applied to gates of p-channel and n-channel current sources that drive the coupling capacitor. Gates of the n-channel and p-channel enhancement switches also receive the input carrier wave when data is high, but are disabled when data is low. Multiple p-channel and n-channel transistors may be used in parallel for each current source or enhancement switch. Each of the multiple transistors in parallel has a gate that is AND'ed with an index signal. The index signals are programmable and determine how many of the parallel transistors are enabled, thus determining the aggregate current.

20 Claims, 7 Drawing Sheets

FALL-TIME ENHANCEMENT OFF

FIG. 4B

FALL-TIME ENHANCEMENT ON

AMPLITUDE SHIFT KEYED (ASK) MODULATOR/TRANSMITTER WITH FAST FALL TIME

FIELD OF THE INVENTION

This invention relates to Amplitude-Shifted-Keyed (ASK) modulator-transmitters, and more particularly to fast fall-time enhanced ASK transmitters.

BACKGROUND OF THE INVENTION

Amplitude-Shifted-Keyed (ASK) modulation is useful for a variety of applications such as Amplitude-Modulation (AM) radio and more recently for Near-Field Communication (NFC). NFC devices are often very low power devices and may run on batteries or use inductive power coupling. The ASK transmitter may be the most power-hungry block in a NFC device. Thus highly power-efficient ASK transmitters are desirable for NFC and other applications.

NFC devices may have a highly efficient antenna that is formed by a spiral of printed metal traces that are formed on a printed-circuit board (PCB). These spiral inductor antennas have very low losses and have a high Q factor. The small antenna losses increase the fall time of the ASK envelope since energy leaks out of the low-loss antenna at a very slow rate. The amplitude stays high for a longer period of time, extending the fall time.

The slow fall time hinders high data rates. A more rapid fall time is desired to support higher data rates.

What is desired is a ASK transmitter with small power losses, yet has fast fall times. A highly power-efficient ASK transmitter with enhanced fall times is desired to achieve faster data rates.

DETAILED DESCRIPTION

The present invention relates to an improvement in ASK transmitters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
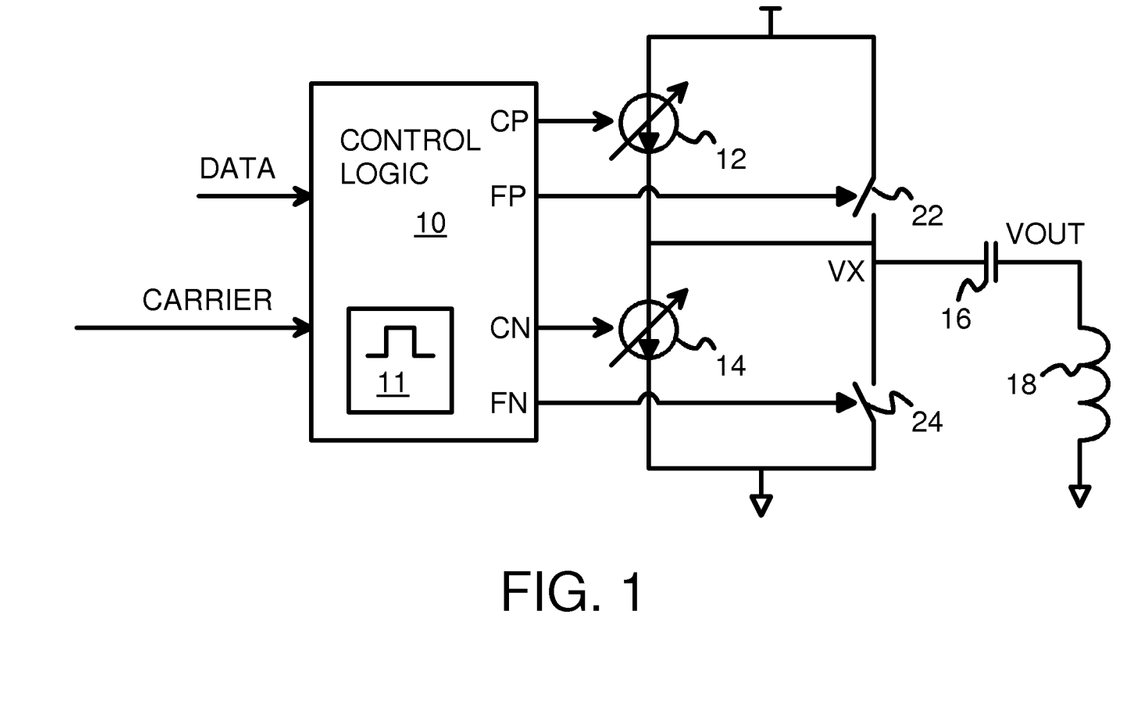
FIG. 1 is a block diagram of a high-efficiency ASK transmitter with fall-time enhancement.

FIG. 1 is a block diagram of a high-efficiency Amplitude-Shifted-Keyed (ASK) transmitter with fall-time enhancement. Control logic 10 receives a carrier wave and a data signal. The data signal reduces the amplitude of the carrier wave for ASK modulation.

Control logic 10 generates Carrier-P and Carrier-N control signals CP, CN, which control variable current sources 12, 14, respectively. Control logic 10 applies the carrier wave to CP, CN so that a carrier wave signal is generated at node VX, and coupled through coupling capacitor 16 to VOUT to drive antenna 18, which can be a spiral inductor antenna on a PCB of a NFC device.

Control logic 10 also generates fall-time-enhancement signals FP, FN, which close switches 22, 24 to accelerate the fall time of VX and VOUT. The faster fall times support higher data rates. When switches 22, 24 are closed, energy is drawn from coupling capacitor 16 through switches 22, 24 to power and ground, which each act as A.C. grounds. Withdrawing energy from coupling capacitor 16 reduces the amplitude of the envelope of the ASK signal on VOUT; thus switches 22, 24 allow the amplitude to more rapidly fall when the data changes state. Pulse generator 11 in control logic 10 generates a pulse for time T to pulse FP, FN and turn on switches 22 and 24 when data transitions from high to low when transmission is enabled and fall-time enhancement is enabled.

Figure 2A:
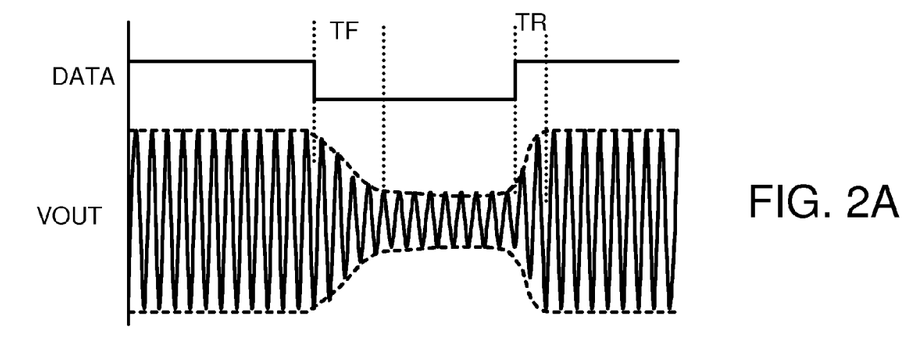
FIGS. 2A-2B show waveforms data-modulated ASK envelopes with enhanced fall times.
Figure 2B:
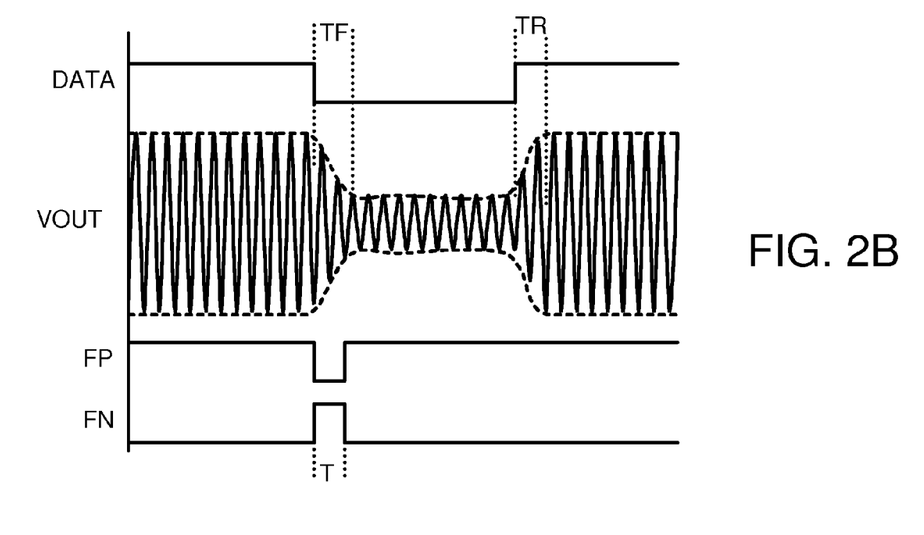

FIGS. 2A-2B show waveforms data-modulated ASK envelopes with enhanced fall times. In FIG. 2A, fall-time enhancement is disabled or otherwise turned off. The carrier wave modulates control signals CP, CN, FP and FN to drive VOUT through coupling capacitor 16 (FIG. 1). When data is high, the carrier has a maximum amplitude. When data is low, the carrier's amplitude is reduced, such as by control logic 10, decreasing the variable current from current sources 12 and 14.

The envelope of VOUT is shown as dashed lines across the maxima and minima of the VOUT waveform. When data transitions from high to low, the envelope is reduced gradually over the fall time TF until a final data-low amplitude is reached. When data transitions from low to high, the envelope is increased over the rise time TR until a final data-high amplitude is reached. The rise time tends to be faster than the fall time. The slow fall time TF can limit the maximum data rate.

In FIG. 2B, fall-time enhancement is enabled or otherwise turned on. Control logic 10 turns on switches 22 and 24 by FP and FN for a period of time T when the data switches from high to low. When control signals FP and FN are turned on, switches 22, 24 turn on to withdraw energy from coupling capacitor 16, thus accelerating the fall time TF. The faster fall time may allow for a higher data rate.

Figure 3:
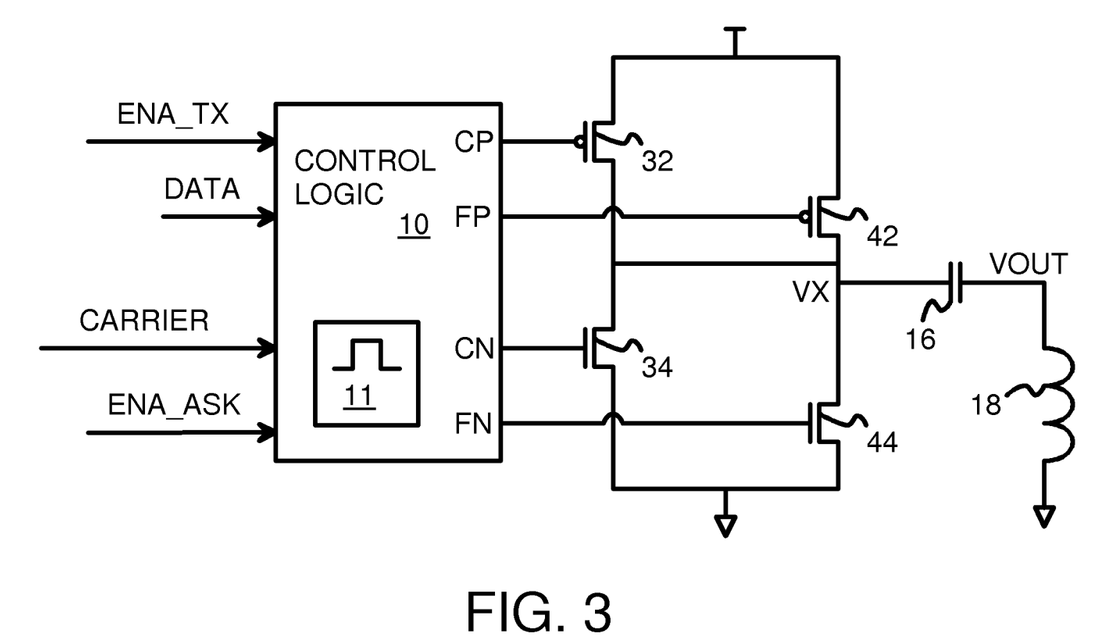
FIG. 3 is a more detailed diagram of an ASK transmitter with fall-time enhancement.

FIG. 3 is a more detailed diagram of an ASK transmitter with fall-time enhancement. Control logic 10 receives a carrier and a data signal, and also receives an enable transmit signal ENA_TX that disables transmission when low, and an enable ASK signal ENA_ASK that blocks the data from modulating the carrier wave when low.

Control logic 10 generates control signal CP, which is applied to the gate of p-channel transistor 32, which acts as a variable current source to node VX. Control logic 10 also generates control signal CN, which is applied to the gate of n-channel transistor 34, which acts as a variable current source (sink) to node VX. When ENA_TX is high, the carrier wave is applied to CP, CN to drive antenna 18 through coupling capacitor 16 with the carrier wave.

Control logic 10 drives FN low when data is low and ENA_TX is high to turn off n-channel transistor 44. When data is high the carrier wave is applied to FN, turning n-channel transistor 44 on and off with the carrier wave, thus increasing the current drive to coupling capacitor 16 and increasing the amplitude.

Similarly, control logic 10 drives FP high when data is low to turn off p-channel transistor 42. This decreases the current drive to VX and coupling capacitor 16, decreasing the amplitude. When data is high the carrier wave is applied to FP, turning p-channel transistor 42 on and off with the carrier wave, thus increasing the current drive to coupling capacitor 16 and increasing the amplitude. Pulse generator 11 in control logic 10 generates a pulse for time T to turn on FP, FN when data transitions from high to low when transmission is enabled and fall-time enhancement is enabled.

The carrier wave is applied to the gates of all four transistors 32, 34, 42, 44 when data is high, and ENA_TX and ENA_ASK are high (enabled). This produces the largest current swings on coupling capacitor 16 and the largest amplitude across antenna 18.

The carrier wave is applied to the gates of only two transistors 32, 34 when data is low, and ENA_TX and ENA_ASK are high (enabled). This produces smaller current swings on coupling capacitor 16 and a smaller amplitude across antenna 18. Thus the ASK envelope amplitude is modulated by the data.

Figure 4A:
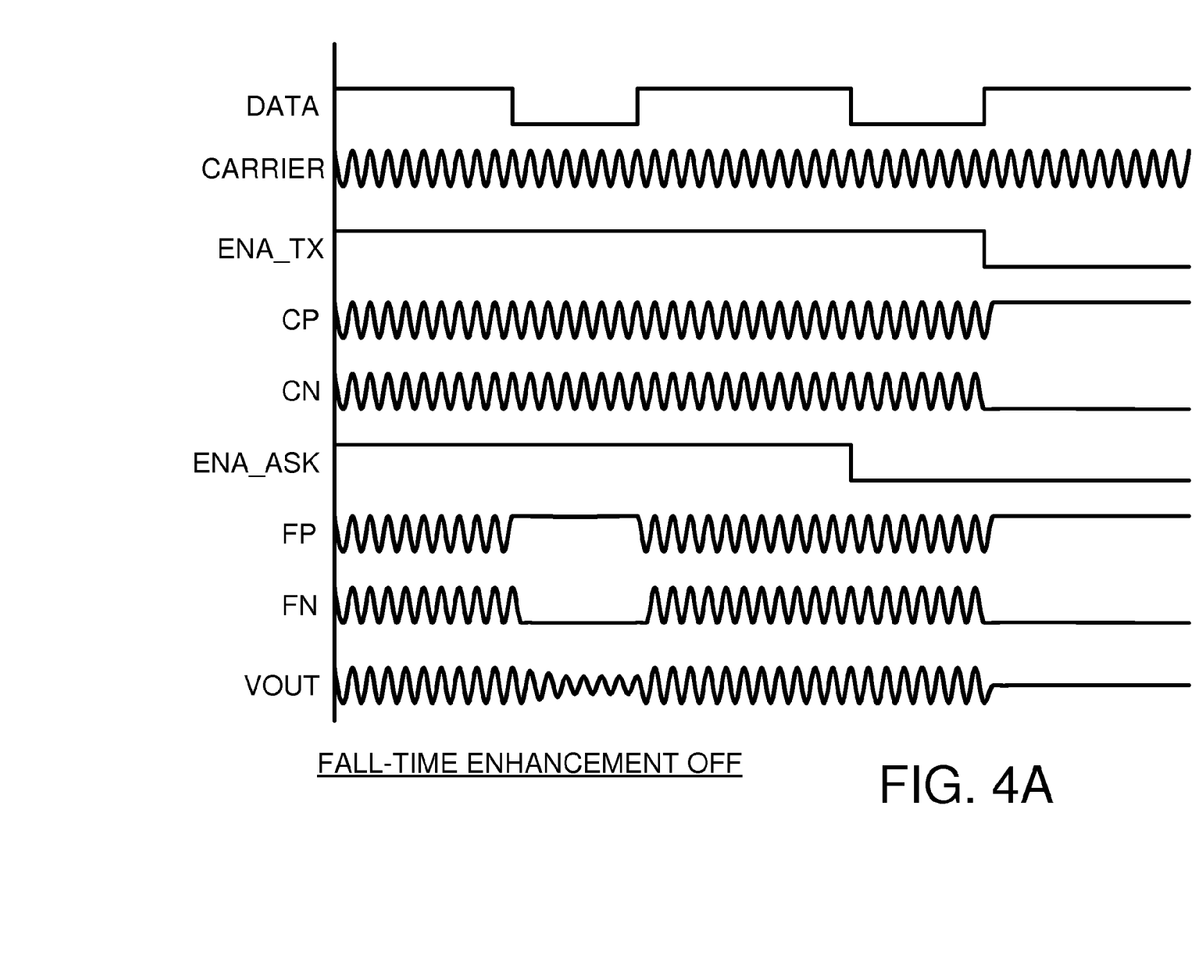
FIG. 4A shows waveforms of the ASK transmitter of FIG. 3 when fall-time-enhancement is disabled.

FIG. 4A shows waveforms of the ASK transmitter of FIG. 3 when fall-time-enhancement is disabled. The data rate is much slower than the carrier. For example, the data rate may be 848 kbps with a carrier frequency of 13.56 MHz. The carrier is passed through to the control signals CP, CN when transmit is enabled (ENA_TX is high). When ENA_TX is low, CP is driven high and CN is driven low to turn off the variable current sources to coupling capacitor 16.

When ENA_TX is high, control signals FP, FN are also driven with the carrier. When data is low and ENA_ASK is high, VOUT is amplitude modulated by driving FP high and FN low to turn off transistors 42, 44. This reduces the current drive to coupling capacitor 16 for low data, reducing the amplitude of VOUT when data is low.

VOUT is amplitude modulated because only two transistors 32, 34 are driving current to coupling capacitor 16 for low data, but four transistors 32, 34, 42, 44 are driving current to coupling capacitor 16 when data is high. The carrier wave produces a larger current swing when four transistors are driving than when only two transistors are driving. The amplitude of VOUT may be 66% or 50% lower when data is low than when data is high, or some other amplitude ratio (ASK index) may be obtained by adjusting the relative sizes and current drives of transistors 32, 34, 42, 44.

Figure 4B:
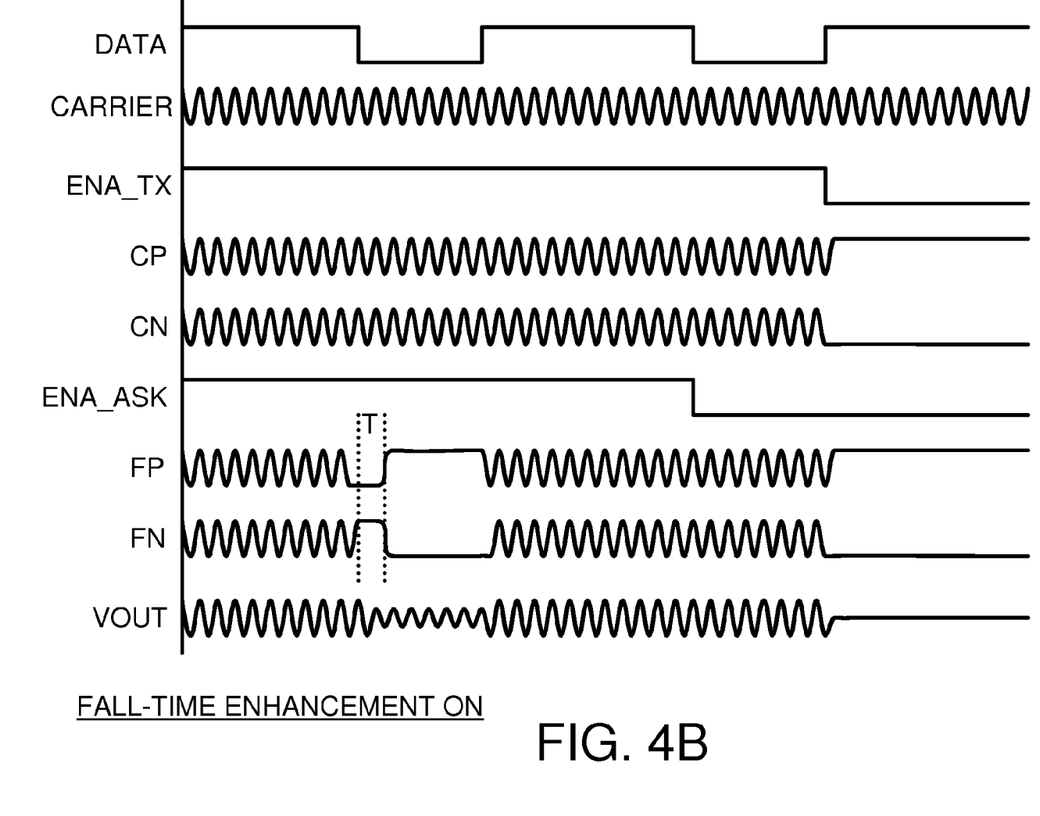
FIG. 4B shows waveforms of the ASK transmitter of FIG. 3 when fall-time-enhancement is enabled.

FIG. 4B shows waveforms of the ASK transmitter of FIG. 3 when fall-time-enhancement is enabled. When ENA_TX and ENA_ASK are active (enabled) and data transitions from high to low, the FP and FN signals are modified to remain on for a period of time T. The carrier waves applied to FP, FN are halted and FP is driven low and FN driven high for the time T after data transitions low. As the carrier wave applied to CP, CN drives current to and from coupling capacitor 16, some of this current can be absorbed through transistors 42, 44, reducing the current and energy driven to coupling capacitor 16. This dampens the current swing from the carrier wave, causing the amplitude of VOUT to be reduce more quickly during time T.

After time T has elapsed, FP is driven high and FN is driven low to turn off transistors 42, 44. The current driven to coupling capacitor 16 is reduced to that from the two transistors 32, 34, producing a smaller voltage swing on VOUT when data is low than when data is high and all four transistors 32, 34, 42, 44 are driving current in response to the carrier wave.

Figure 5:
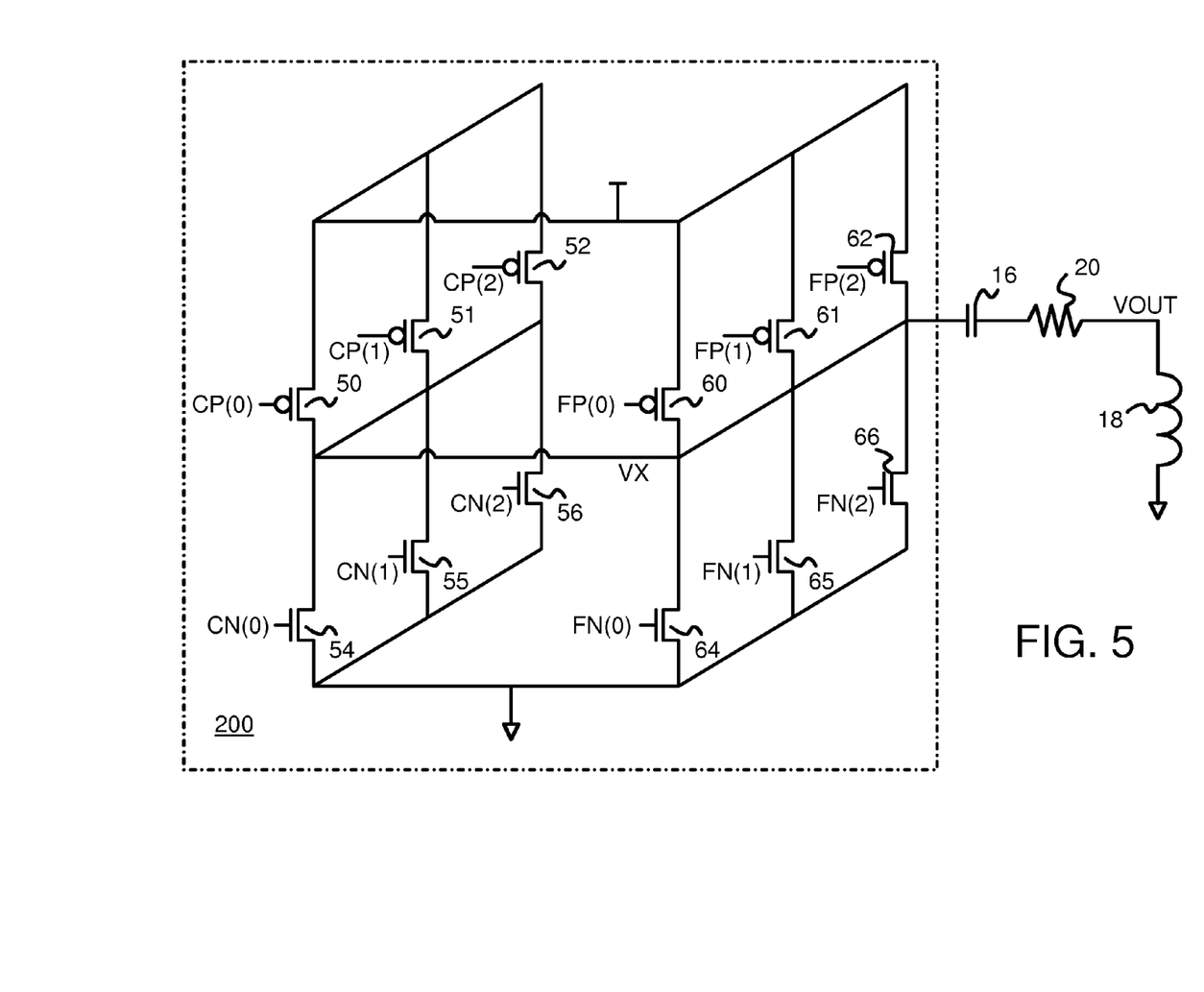
FIG. 5 is a diagram of an ASK transmitter with a variable ASK modulation ratio.

FIG. 5 is a diagram of an ASK transmitter with a variable ASK ratio. Rather than have a single transistor 32 (FIG. 3), p-channel transistors 50, 51, 52 are in parallel between power and node VX. The amount of current driven may be adjusted by enabling one, two, or all of gate control signals CP(0), CP(1), and CP(2). Maximum current is obtained when all three transistors 50, 51, 52 are enabled, while minimum current is obtained when only one of transistors 50, 51, 52 is enabled. Control logic 10 can generate CP(0), CP(1), and CP(2) by AND'ing CP with ASK index enables that determine the drive strength desired by ASK driver 200.

Likewise, the single transistor 34 (FIG. 3) is replaced by p-channel transistors 54, 55, 56 in parallel between node VX and ground. The amount of current driven from VX may be adjusted by enabling one, two, or all of gate control signals CN(0), CN(1), and CN(2). Maximum current is obtained when all three transistors 54, 55, 56 are enabled, while minimum current is obtained when only one of transistors 54, 55, 56 is enabled. Control logic 10 can generate CN(0), CN(1), and CN(2) by AND'ing CN with ASK index enables that determine the drive strength desired.

The fall-time enhancement transistor 42 (FIG. 3) may also be replaced by multiple p-channel transistors 60, 61, 62 that receive control signals FP(0), FP(1), and FP(2) that are generated by AND'ing FP with the ASK index enables. Likewise, fall-time enhancement transistor 44 (FIG. 3) may be replaced by multiple n-channel transistors 64, 65, 66 that receive control signals FN(0), FN(1), and FN(2) that are generated by AND'ing FN with the ASK index enables. The current driven to node VX and coupled through coupling capacitor 16 to antenna 18 may be adjusted in a variety of ways.

The overall current and amplitude may be increased by increasing the number of parallel transistors that are enabled. Alternately, the amplitude may be reduced by reducing the number of parallel transistors enabled.

A desired ASK modulation index, or ratio of the amplitude for low data to the amplitude for high data, may be obtained by adjusting the number of parallel transistors enabled. For example, CP(0), CP(1) and CN(0), CN(1) could be driven with CP and CN, while CP(2) is driven high and CN(2) is driven low to disable transistors 52, 56.

FP(0) and FN(0) could be driven with FP and FN, while FP(1) and FP(2) are driven high and FN(1) and FN(2) are driven low to disable transistors 61, 62, 65, 66. Then two transistors are driven by CP but only one transistor is driven by FP, which could make the data low amplitude two-thirds of the data-high amplitude when identical transistor sizes are used.

When an ASK modulation index of 50% is desired, the same number of transistors could be enabled by CP (and CN) as are enabled by FP (and FN). The fall-time enhancement could be increased by increasing the number of transistors 60-62 and 64-66 that are enabled during time T or decreased by decreasing the number of transistors 60-62 and 64-66 that are enabled during time T. The fall-time enhancement could also be increased by increasing the length of T; a longer time T would result in a faster fall time. Programmable registers could be used to selectively enable each gate of transistors 50-52, 54-56, 60-62, and 64-66 to allow the amplitude and fall time to be fine tuned. For example, undershoot may occur when the fall-time enhancement transistors provide too much current. When undershoot is observed, the number of transistors enabled may be reduced by re-programming the programmable registers.

Figure 6:
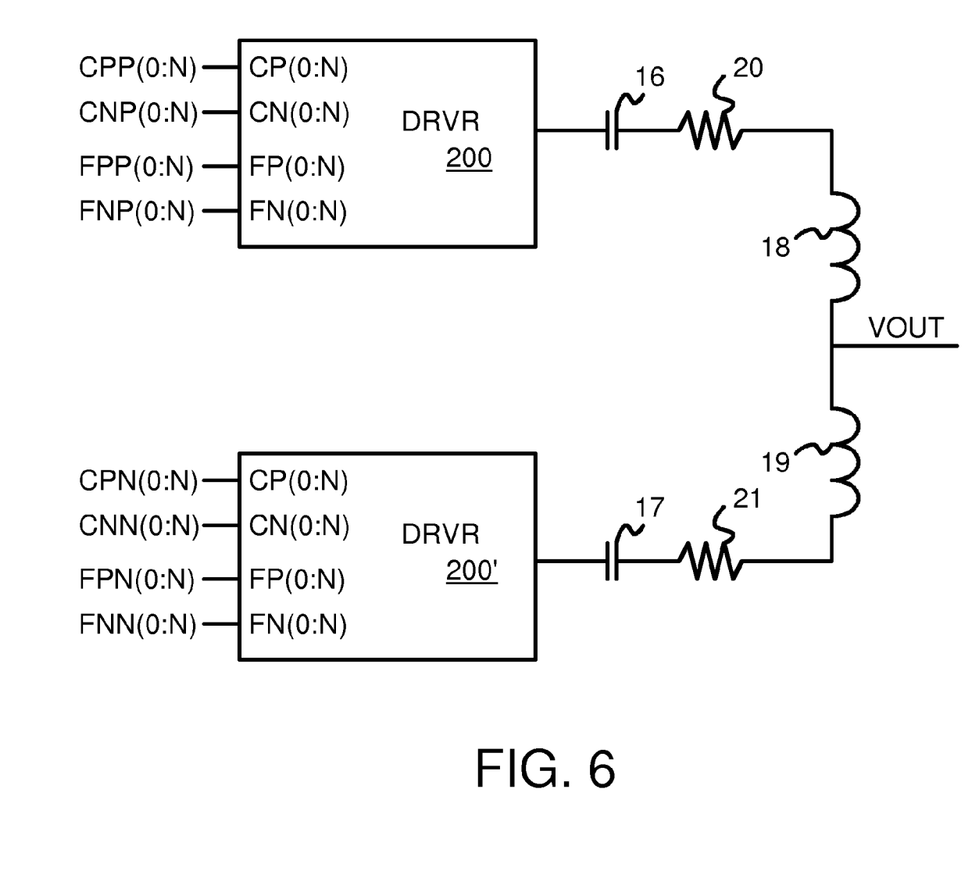
FIG. 6 shows a differential ASK transmitter.

FIG. 6 shows a differential ASK transmitter. ASK driver 200 (FIG. 5) receives positive P control signals CPP(0:N) for CP(0), CP(1), . . . CP(N), also CNP(0:N) for CN(0), CN(1), . . . CN(N), etc. Complementary ASK driver 200' (FIG. 5) receives negative N control signals CPN(0:N) for CP(0), CP(1), . . . CP(N), also CNN(0:N) for CN(0), CN(1), . . . CN(N), etc. Negative N control signals may be the inverse of positive P control signals for differential signaling.

ASK driver 200 has its node VX drive coupling capacitor 16 which drives antenna 18 through series resistor 20 to VOUT. Complementary ASK driver 200' has its node VX drive coupling capacitor 17 which drives antenna 19 through series resistor 21 to VOUT. A pair of differential receiving antennas on the receiver device may detect the differential signals radiated by antennas 18, 19. The drive strength may be adjusted for both true and complementary ASK drivers by adjusting transistor enables as described for FIG. 5.

ALTERNATE EMBODIMENTS

Several other embodiments are contemplated by the inventor. For example while three transistors in parallel have been shown in FIG. 5, additional transistors may be in parallel. The size of each transistor in parallel does not have to be equal. Some parallel transistors could have larger current drives while other parallel transistors have lower current drives. For example, the current drives could increase by powers of two. The number of parallel transistors does not have to be the same for each of transistors 32, 34, 42, 44 of FIG. 3 when generating the circuit of FIGS. 5, 6. There could be more transistors in parallel to replace transistor 42 than to replace transistor 34 as an example. When many parallel transistors are available, the ASK index may be adjustable from near 0% to near 100% by adjusting the currents to change the ratio of the amplitude when data is high and the amplitude when data is low.

While NFC devices have been described, other applications or variations may use the ASK modulator/transmitter, such as Radio-Frequency Identification (RFID).

Series resistors 20, 21 of FIG. 6 may be deleted in some embodiments. Similarly, a series resistor may be added between coupling capacitor 16 and antenna 18 in other embodiments such as that of FIGS. 1, 3. The series resistor increases power consumption but also improves fall time. The fall time enhancement may be disabled in some embodiments, or only n-channel transistor 44 and not p-channel transistor 42 may be enabled during time T. Such features may be enabled for some data rates, such as 424 kbps, and disable for other data rates, such as 212 kbps. Fall-time enhancement may be enabled only for higher data rates and disabled for lower data rates. The amount of time T may also be adjusted. Control logic 10 could have a delay line that is programmable to generate a desired time T.

The data input to control logic 10 may be latched or delayed. The phase of the carrier wave may be altered such as by adding a delay or inverting the carrier wave. The shape of the carrier wave may be altered such as by filtering or clipping, and the carrier wave's shape may appear different at different time scales for different data rates. Control logic 10 could have combinatorial logic such as AND, NAND, NOR, OR gates, inverters, in various combinations, or array logic. Control logic 10 may generate signals such as FP, FN, CP, CN by AND'ing and OR'ing inputs, such as by generating FN=ENA_TX AND ENA_ASK AND DATA AND carrier_wave, OR (ENA_TX AND ENA_ASK AND NOT_DATA AND pulse time T). Other signals may be similarly generated by those skilled in the art of logic design. Index select signals to adjust the currents may also be AND'ed in to enable or disable multiple parallel gates, such as shown in FIG. 5.

Additional components may be added at various nodes, such as resistors, capacitors, inductors, transistors, etc., and parasitic components may also be present. Enabling and disabling the circuit could be accomplished with additional transistors or in other ways. Pass-gate transistors or transmission gates could be added for isolation.

Inversions may be added, or extra buffering. The final sizes of transistors and capacitors may be selected after circuit simulation or field testing. Metal-mask options or other programmable components may be used to select the final capacitor, resistor, or transistor sizes. Coupling capacitor 16 may be on-chip or off-chip, as could antenna 18.

P-channel rather than n-channel transistors (or vice-versa) may be used for some technologies or processes, and inversions, buffers, capacitors, resistors, gates, or other components may be added to some nodes for various purposes and to tweak the design.

Timings may be adjusted by adding delay lines or by controlling delays in leading-edge blocking units. Pulse generators could also be added. The outputs or control signals may be swapped to add an inversion. Inverting and non-inverting inputs may be swapped and the polarity of the output reversed.

Separate power supplies and grounds may be used for some components. The bulk or substrate nodes may be tied to power for p-channel transistors, and to ground for n-channel transistors, or a substrate bias generate be used to generate bulk voltages. Various filters could be added. Active low rather than active high signals may be substituted.

While positive currents have been described, currents may be negative or positive, as electrons or holes may be considered the carrier in some cases. Source and sink currents may be interchangeable terms when referring to carriers of opposite polarity. Currents may flow in the reverse direction.

The signals applied to the gates of p-channel and n-channel transistors may be switched to power or ground to power down the circuit. The p-channel transistors could be replaced with resistors or depletion transistors or other kinds of current sources in some embodiments. Conversely, some or all of the n-channel transistors could be replaced by resistors or other passive current sink devices.

The circuit designer may choose resistors, capacitors, transistors, and other components to have a ratio that produces the desired reference voltages. While Complementary-Metal-Oxide-Semiconductor (CMOS) transistors have been described, other transistor technologies and variations may be substituted, and materials other than silicon may be used, such as Galium-Arsinide (GaAs) and other variations. DMOS, LDMOS, and diffusion-enhanced transistors may be used.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An Amplitude-Shifted-Keyed (ASK) transmitter comprising:
   a first variable current source for sourcing a first current to a combining node in response to a first carrier-wave signal;
   a second variable current source for sinking a second current from the combining node in response to a second carrier-wave signal;
   a first fall-enhancement switch for sourcing a first enhancement current to the combining node in response to a first enhancement signal;
   a second fall-enhancement switch for sinking a second enhancement current from the combining node in response to a second enhancement signal;
   a data input and a carrier-wave input, the carrier-wave input having a carrier signal with a higher frequency that a data rate of the data input; and
   control logic that receives the carrier-wave input and generates the first carrier-wave signal and the second carrier-wave signal each having a carrier wave with a same frequency as the carrier signal of the carrier-wave input;
   the control logic also generating the first enhancement signal in an inactive state that disables the first fall-enhancement switch from sourcing the first enhancement current when the data input is in a second state, the control logic generating the first enhancement signal having the carrier wave to enable the first fall-enhancement switch to source the second current when the data input is in a first state;
   the control logic also generating the second enhancement signal in an inactive state that disables the second fall-enhancement switch from sinking the second enhancement current when the data input is in the second state, the control logic generating the second enhancement signal having the carrier wave to enable the second fall-enhancement switch to sink the second current when the data input is in the first state;
   wherein the control logic drives the carrier wave to the first fall-enhancement switch and to the second fall-enhancement switch when the data input is in the first state, but disables the first fall-enhancement switch and to the second fall-enhancement switch when the data input is in the second state, wherein an amplitude of an envelope of the combining node is reduced when data input is in the second state.

2. The ASK transmitter of claim 1 further comprising:
   a coupling capacitor connected between the combining node and an output node, the output node for connecting to an antenna.

3. The ASK transmitter of claim 1 further comprising:
   a coupling capacitor and a series resistor connected in series and connected between the combining node and an output node, the output node for connecting to an antenna.

4. The ASK transmitter of claim 1 further comprising:
   a first enhancement pulse generator, in the control logic and activated when the data input transitions from the first state to the second state, for initially driving the first enhancement signal into an active state that causes the first fall-enhancement switch to source the first enhancement current and then after a predetermined period of time driving the first enhancement signal into the inactive state;
   a second enhancement pulse generator, in the control logic and activated when the data input transitions from the first state to the second state, for initially driving the second enhancement signal into an active state that causes the second fall-enhancement switch to source the second enhancement current and then after the predetermined period of time driving the second enhancement signal into the inactive state;
   whereby the first and second fall-enhancement switches are pulsed on for the predetermined period of time after the data input transitions from the first state to the second state.

5. The ASK transmitter of claim 4 wherein a fall time from when the data input transitions from the first state to the second state until the amplitude of the envelope of the combining node is reduced by a predetermined amount is reduced when the first and second fall-enhancement switches are pulsed compared to the fall time when first and second fall-enhancement switches are not pulsed,
   whereby fall time is reduced.

6. The ASK transmitter of claim 4 wherein the first fall-enhancement switch comprises a p-channel transistor having a gate receiving the first enhancement signal and a drain connected to the combining node and a source connected to a power supply;
   wherein the second fall-enhancement switch comprises an n-channel transistor having a gate receiving the second enhancement signal and a drain connected to the combining node and a source connected to a ground.

7. The ASK transmitter of claim 6 wherein the first variable current source comprises a p-channel transistor having a gate receiving the first carrier-wave signal and a drain connected to the combining node and a source connected to a power supply;
   wherein the second variable current source comprises an n-channel transistor having a gate receiving the second carrier-wave signal and a drain connected to the combining node and a source connected to the ground.

8. The ASK transmitter of claim 1 wherein the first variable current source comprises a plurality of first p-channel transistors each having a gate receiving the first carrier-wave signal gated with a first index signal and a drain connected to the combining node and a source connected to the power supply;

wherein the first index signals enable and disable first p-channel transistors in the plurality of first p-channel transistors to adjust the first current;

wherein the second variable current source comprises a plurality of second n-channel transistors each having a gate receiving the second carrier-wave signal gated with a second index signal and a drain connected to the combining node and a source connected to a ground;

wherein the second index signals enable and disable second p-channel transistors in the plurality of second p-channel transistors to adjust the second current.

9. The ASK transmitter of claim 1 wherein the first fall-enhancement switch comprises a plurality of third p-channel transistors each having a gate receiving the first enhancement signal gated with a third index signal and a drain connected to the combining node and a source connected to a power supply;

wherein the third index signals enable and disable third p-channel transistors in the plurality of third p-channel transistors to adjust the first enhancement current;

wherein the second fall-enhancement switch comprises a plurality of fourth n-channel transistors each having a gate receiving the second enhancement signal gated with a fourth index signal and a drain connected to the combining node and a source connected to a ground;

wherein the fourth index signals enable and disable fourth n-channel transistors in the plurality of fourth n-channel transistors to adjust the second current.

10. An Amplitude-Shifted-Keyed (ASK) modulating transmitter comprising:

a data input having a data signal;

a carrier-wave input having a carrier wave having a higher frequency than a data rate of the data signal;

a combining node for connecting to a coupling capacitor to drive an output;

a first strength buffer that drives a first current to the combining node in response to a first control signal;

a first modulating buffer that drives a first modulating current to the combining node in response to a first modulation control signal;

a second strength buffer that drives a second current to the combining node in response to a second control signal;

a second modulating buffer that drives a second modulating current to the combining node in response to a second modulation control signal; and control logic that drives the carrier wave to the first control signal and to the second control signal when transmission is enabled, and drives the carrier wave to the first modulation control signal and to the second modulation control signal when transmission is enabled and the data signal is in a first state, but drives a disabling signal onto the first modulation control signal and onto the second modulation control signal when transmission is enabled or when the data signal is not in the first state, wherein the first modulating buffer and the second modulating buffer are disabled from driving currents when the data signal is not in the first state, wherein an amplitude of an output signal on the output is reduced when the data signal is not in the first state than when the data signal is in the first state, whereby the amplitude is modulated by disabling the first and second modulating buffers when the data signal is not in the first state.

11. The ASK modulating transmitter of claim 10 further comprising:

a pulse generator in the control logic that generates a pulse when the data signal transitions out of the first state and transmission is enabled;

wherein the control logic drives the first modulation control signal with an enabling signal that causes the first modulating buffer to drive the first modulating current to the combining node when the pulse is generated and before the first modulation control signal is driven with the disabling signal when the pulse ends;

wherein the control logic drives the second modulation control signal with an enabling signal that causes the second modulating buffer to drive the second modulating current to the combining node when the pulse is generated and before the second modulation control signal is driven with the disabling signal when the pulse ends;

whereby the first and second modulating buffers are pulsed on when the data signal transitions out of the first state.

12. The ASK modulating transmitter of claim 10 further comprising:

an enable transmit input;

an enable modulation input;

wherein transmission is enabled by the control logic when the enable transmit input and the enable modulation input are both active.

13. The ASK modulating transmitter of claim 10 further comprising:

an antenna that is connected to the coupling capacitor, the antenna for broadcasting ASK-modulated signals passed through the coupling capacitor.

14. The ASK modulating transmitter of claim 13 wherein the antenna is a spiral inductor antenna formed by a wiring trace on a printed-circuit board (PCB), wherein the antenna has very low losses and a high Q factor.

15. The ASK modulating transmitter of claim 10 wherein the first strength buffer comprises a first transistor having a first gate receiving the first control signal, the first gate controlling the first current;

wherein the first modulating buffer comprises a first modulating transistor having a first modulating gate receiving the first modulation control signal, the first modulating gate controlling the first modulating current;

wherein the second strength buffer comprises a second transistor having a second gate receiving the second control signal, the second gate controlling the second current;

wherein the second modulating buffer comprises a second modulating transistor having a second modulating gate receiving the second modulation control signal, the second modulating gate controlling the second modulating current.

16. The ASK modulating transmitter of claim 15 wherein the first transistor is a p-channel transistor having a channel between a power supply and the combining node;

wherein the first modulating transistor is a p-channel transistor having a channel between the power supply and the combining node.

17. The ASK modulating transmitter of claim 16 wherein the second transistor is a n-channel transistor having a channel between the combining node and a ground;

wherein the second modulating transistor is a n-channel transistor having a channel between the combining node and a ground.

18. The ASK modulating transmitter of claim 10 wherein the first strength buffer comprises a first index transistor, a second index transistor, and a third index transistor, wherein the first current is a sum of currents from the first index transistor, the second index transistor, and the third index transistor, wherein index control signals are combined with the first control signal to enable and disable one or more of the first index transistor, the second index transistor, and the third index transistor to adjust the first current;

wherein the second strength buffer comprises a fourth index transistor, a fifth index transistor, and a sixth index transistor, wherein the second current is a sum of currents from the fourth index transistor, the fifth index transistor, and the sixth index transistor, wherein index control signals are combined with the second control signal to enable and disable one or more of the fourth index transistor, the fifth index transistor, and the sixth index transistor to adjust the second current.

19. The ASK modulating transmitter of claim 18 wherein the first index transistor, the second index transistor, and the third index transistor are p-channel transistors having channels in parallel between the combining node and a power supply;

wherein the fourth index transistor, the fifth index transistor, and the sixth index transistor are n-channel transistors having channels in parallel between the combining node and a ground.

20. A differential Amplitude-Shifted-Keyed (ASK) driver comprising:

a first coupling capacitor between a first combining node and a first antenna;

a second coupling capacitor between a second combining node and a second antenna connected to or combined with the first antenna;

a first ASK driver comprising an ASK driver cell that receives true inputs and drives the first combining node;

a second ASK driver comprising the ASK driver cell that receives complement inputs of the true inputs and drives the second combining node;

wherein the ASK driver cell comprises:

a first strength buffer that drives a first current to the combining node in response to a first control signal;

a first modulating buffer that drives a first modulating current to a combining node in response to a first modulation control signal;

a second strength buffer that drives a second current to the combining node in response to a second control signal;

a second modulating buffer that drives a second modulating current to the combining node in response to a second modulation control signal;

wherein the true inputs comprise the first control signal, the second control signal, the first modulation control signal, and the second modulation control signal;

control logic means for driving a carrier wave to the first control signal and to the second control signal when transmission is enabled, and for driving the carrier wave to the first modulation control signal and to the second modulation control signal when transmission is enabled and a data signal is in a first state, and for driving a disabling signal onto the first modulation control signal and onto the second modulation control signal when transmission is enabled or when the data signal is not in the first state, wherein the first modulating buffer and the second modulating buffer are disabled from driving currents when the data signal is not in the first state, wherein an amplitude of an output signal on the combining node is reduced when the data signal is not in the first state than when the data signal is in the first state, whereby the amplitude is modulated by disabling the first and second modulating buffers when the data signal is not in the first state.

* * * * *